March 14, 1967   E. SPIESSL   3,308,734
PHOTOGRAPHIC SHUTTER WITH DIAPHRAGM MECHANISM
Filed July 22, 1964   2 Sheets-Sheet 1

March 14, 1967  E. SPIESSL  3,308,734

PHOTOGRAPHIC SHUTTER WITH DIAPHRAGM MECHANISM

Filed July 22, 1964  2 Sheets-Sheet 2

United States Patent Office 3,308,734
Patented Mar. 14, 1967

3,308,734
PHOTOGRAPHIC SHUTTER WITH DIAPHRAGM MECHANISM
Ewald Spiessl, Deisenhofen, near Munich, Germany, assignor to Compur-Werke Gesellschaft mit beschränkter Haftung & Co., Munich, Germany
Filed July 22, 1964, Ser. No. 384,377
Claims priority, application Germany, Aug. 8, 1963, C 10,793
6 Claims. (Cl. 95—64)

The present invention relates to a camera shutter having an operating member which functions to cock, open and close the shutter blades and which also performs the function of setting the aperture of the diaphragm blades.

It is desirable in reflex type cameras for example, to maintain the diaphragm blades in a fully open position and to bring the blades to the desired aperture setting immediately prior to the opening and closing of the shutter for the exposure. According to the present invention there is provided an operating ring which is adapted to be rotated to actuate the shutter. A diaphragm control ring is rotatable to open and close the diaphragm blades and this control ring has a projection engageable with an abutment on the operating ring. Spring means extending between the operating ring and the control ring maintains a positive engagement between the abutment and projection. Thus, when the operating ring is rotated, the control ring is also rotated to bring the diaphragm blades to the desired opening. There is provided a return spring which brings the operating ring back to its original position after actuation of the shutter.

The control ring is adapted to be positioned by either a setting cam on a manually rotatable setting ring or by means of an abutment member operated by a photoelectric exposure meter dependent upon whether manual or automatic setting is chosen.

The operating ring is rotatably mounted on the rear face of the shutter and the rest position of the operating ring is determined by an abutment rigidly mounted in the housing.

An object of the present invention is to provide an operating mechanism for a camera shutter in which an operating ring is adapted to control both the opening and closing of the shutter and the movement of the diaphragm blades to a predetermined exposure opening.

Another object of the present invention is to provide a camera shutter with a rotatable operating ring and diaphragm control ring in which a projection on the control ring cooperates with an abutment on the operating ring and spring means maintains the projection in engagement with the abutment.

Figure 2:
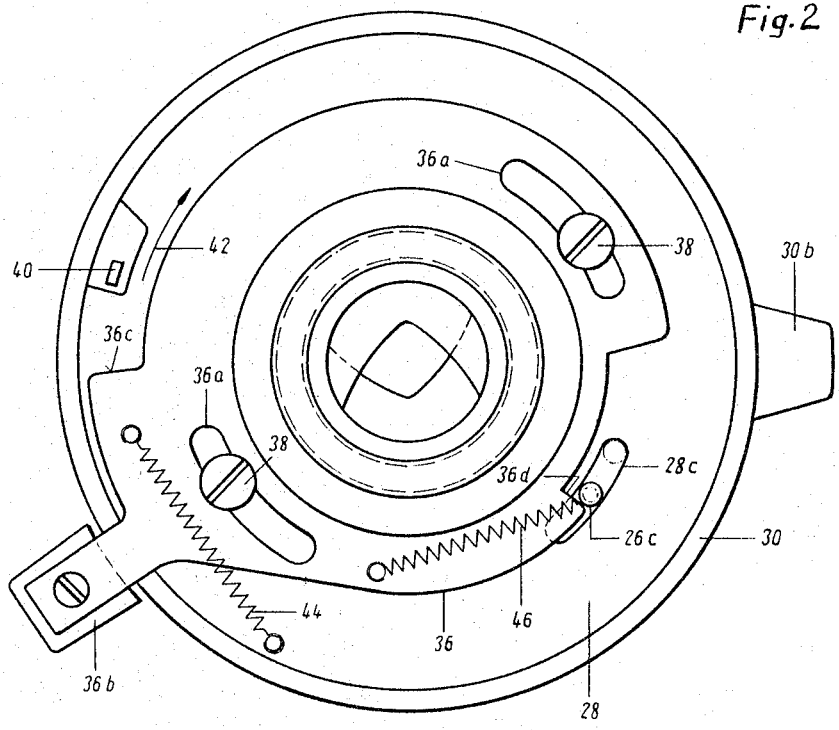
Figure 1:
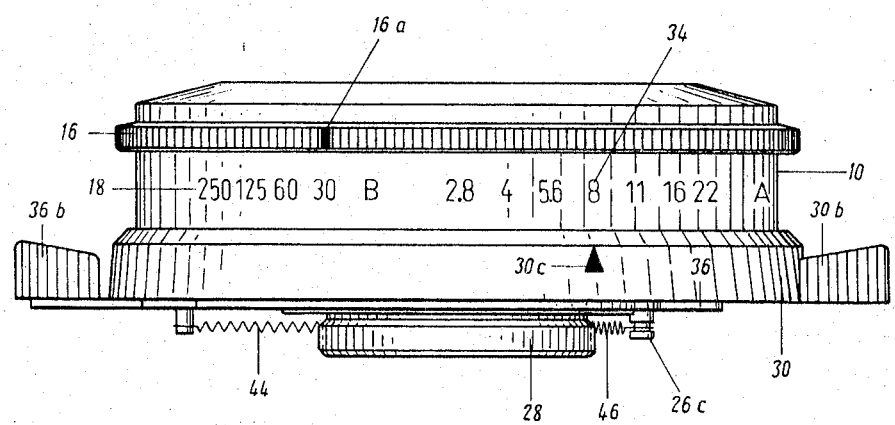
Figure 3:
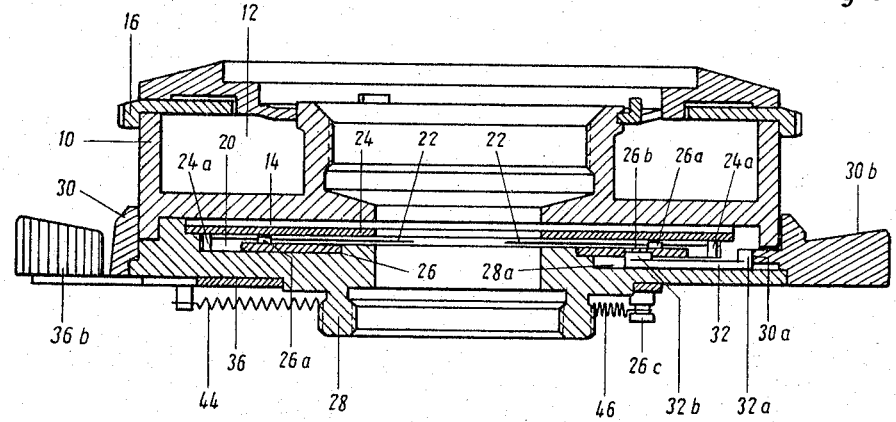
Figure 4:
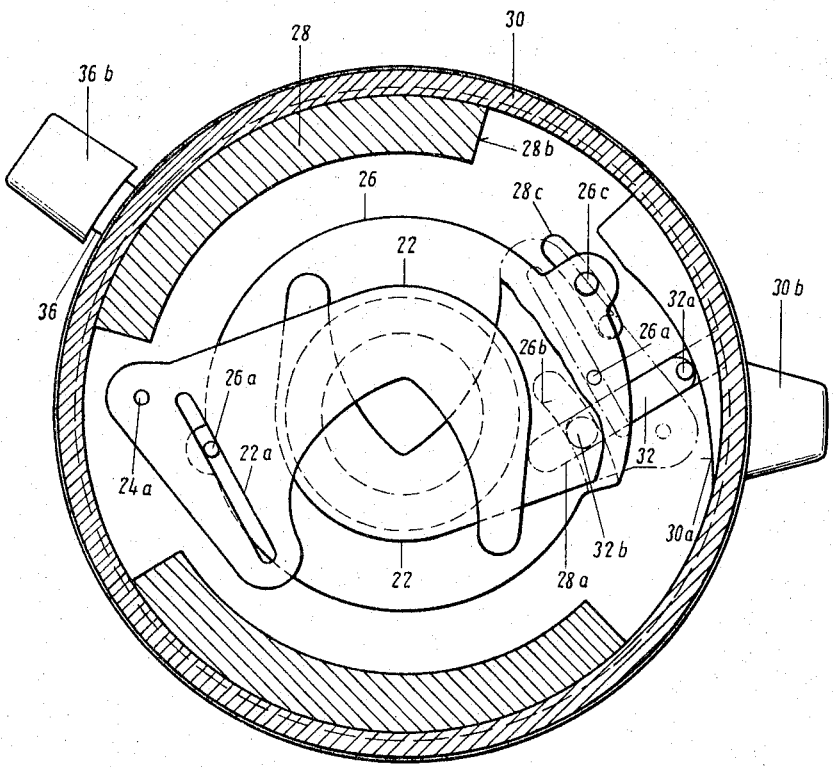

Other objects and many of the attendant advantages of the present invention will become more readily apparent upon consideration of the following detailed specification in connection with the accompanying drawings wherein:

FIG. 1 is a plan view of a shutter embodying the present invention,
FIG. 2 is a rear elevational view,
FIG. 3 is a transverse sectional view, and
FIG. 4 is a longitudinal sectional view thereof.

The invention is described below in reference to a diaphragm setting mechanism of a photographic objective shutter.

The mechanism for operating the shutter blades which is not shown is well known per se and this mechanism is installed in the annular space 12 in the shutter housing 10 and actuates shutter blades disposed in gap 14. A hand setter 16 which is provided with milled peripheral indentations is used to set the desired exposure period, the marker 16a thereof cooperating with a time scale 18 at the periphery of the shutter housing 10.

In addition a diaphragm mechanism, comprising two blades 22, is located in the annular gap 20 within the shutter housing 10. Each diaphragm blade 22 is pivotally mounted on a bearing pin 24a on a mounting ring 24 (FIG. 3), rigid with the housing, and each of these blades has a control slot 22a in which engages a control pin 26a of a diaphragm control ring 26. A manual diaphragm setting ring 30 is rotatably mounted at the periphery of the housing 10 and setting ring 30 is disposed between this housing and the plate 28 which is rigidly screwed onto the housing. Plate 28 has a rear objective tube and a setting cam 30a which is provided on the inner periphery of the ring 30 projects inwards through a peripheral slot 28b in the housing plate 28. A straight slot 28a is milled in the part 28 and, guided in this slot is a transverse slide 32 which has two pins 32a and 32b which project from the longitudinal face thereof. The pin 32a cooperates with the setting cam 30a of the manual setter 30, while the pin 32b engages in a curved coupling slot 26b of the diaphragm control ring 26. The ring 26 also carries a pin 26c which is parallel to the optical axis and projects rearwardly and outwards through an opening 28c in the plate 28. The hand setter 30 in addition has a finger grip 30b and a marker 30c which cooperates with a diaphragm scale 34 and an index "A" disposed on the periphery of the shutter housing 10.

Mounted on the rear side of the housing plate 28 is an operating ring 36 which is guided for rotation by two fixed guide screws 38 which engage in two slots 36a in the ring. The ring 36 has a finger grip 36b and a shoulder 36c which cooperates with an operating lug 40 which projects rearwards from the shutter housing. The lug 40 can be urged in the direction of arrow 42 by shoulder 36c, and the driving means for the shutter (not shown), being hereby initially cocked and then released for operating the shutter in the well known manner. A return spring 44 is anchored at one end to the housing plate 28 and at the other end to the ring 36 and urges operating ring 36 into a rest position determined by engagement of screw 38 with the end of slot 36a. A tension spring 46 is anchored at one end to the pin 26c and at the other to the ring 36. Finally, a further shoulder 36d is provided on the ring 36 and this shoulder cooperates with the pin 26c in a manner to be described more fully hereinafter.

It is also noted that the manual setter 30 can be indexed by means of an indexing mechanism (not shown) into each position of the diaphragm scale 34 or into the setting corresponding to mark "A."

In the rest position the operating ring 36 is held in abutment against the screws 38 by the return spring 44. In these circumstances the shoulder 36d thereof presses against the pin 26c and holds it in the limit position indicated in dotted lines in FIGS. 2 and 4, in which position the diaphragm blades 22 completely free the objective aperture. The slide is drawn radially inwards and held out of engagement with the setting cam 30a of the manual setter 30 by the diaphragm control ring 26, now in its limit position, through the control slot 26b. The user can now set a required diaphragm value, in the case illustrated the value "8" (FIG. 1), by turning the hand setter 30, whereby the setting cam 30a assumes a specific position relatively to the pin 32a.

When, for the purpose of taking a photograph, the operating ring 36 is turned by hand from its rest position and in the direction of arrow 42 against the action of its return spring 44, the diaphragm control ring 26 is also moved in this direction due to the action of spring 46. The pin 26c moves from the limit position indicated in dotted lines in FIG. 4 in the counter clockwise direction into the position illustrated in full lines, the transfer slide 32 being moved by virtue of the cooperation of the control slot 26b and the pin 32b, in its guide slot 28a and radially outwards until the pin 32a thereof meets the setting cam 30a and stops the movement of the diaphragm control ring 26. The diaphragm blades 22 then assume a position corresponding to the pre-set diaphragm value.

During the further movement of the operating ring 26 in the direction of arrow 42, the engagement between 26c and 36d is broken and the spring 46 tensioned; the ring 36 now continues to move alone relatively to the stationary ring 26 until its shoulder 36c meets the operating lever 40 of the shutter and brings about an opening and closing of the shutter driving means. After the photograph has been taken and the grip piece 36b freed, the operating ring 36 is returned to its rest position under the action of its return spring 44, the shoulder 36d thereof moving the pin 26c, and consequently the diaphragm control ring 26, back to the full-diaphragm-opened position.

Where an automatic regulation of the diaphragm is desired, in contrast to the manual setting just described, the manual setter 36 is adjusted to "A." The setting cam 30a is as a consequence moved out of the range of the pin 32a of the transfer slide 32. The diaphragm opening on operation of the ring 36 is now determined by the pin 26c, during the movement in the direction of arrow 42, meeting an abutment (not shown) controlled by a photoelectric exposure meter of the camera. The remaining part of the setting procedure is the same as in the case of manual setting, with the exception of the difference which has been stated, namely that the transfer slide 32 now has an idle motion in its control slot 28a, that is to say it does not abut the setting cam 30a.

The coaction between the shutter operating means and the diaphragm control ring, in accordance with the invention, makes it possible to bring the diaphragm setting means into the setting position in the same movement with which the shutter operation is effected, and it is of no moment whether this setting position is determined by the diaphragm hand setter or the photoelectric exposure meter built in the camera. This operative coupling which is presented by simple elements, namely a tension spring and cooperating abutments, is disengaged automatically as soon as the diaphragm control ring reaches its setting position and is automatically remade when the operating means returns to the rest position. The construction of the operating means as a ring rotatably mounted at the rear of the shutter has the further advantage of removing from the internal space of the shutter a considerable amount of structural parts and of providing an arrangement which is readily assembled and serviced.

Obviously many modifications and variations of the present invention are possible in light of the above teachings. What is claimed as new and is desired to be secured by Letters Patent is:

1. A shutter mechanism for a camera comprising a housing, shutter actuating means in said housing, diaphragm blades pivotally mounted in said housing, a diaphragm control ring rotatably mounted in said housing for pivoting said blades to a predetermined setting interconnecting means for said diaphragm control ring and said shutter actuating means, said interconnecting means including a projection on said diaphragm control ring and an abutment on said actuating means, and spring means connected between said diaphragm control ring and said actuating means whereby initial rotation of said shutter actuating means rotates said diaphragm control ring to pivot the diaphragm blades to the predetermined setting thereof and further rotation of said shutter actuating means actuates the shutter.

2. A shutter mechanism for a camera comprising a housing for the shutter, actuating means for opening and closing the shutter, said actuating means including an operating ring, diaphragm blades pivotally mounted in said housing, a diaphragm control ring for positioning said diaphragm blades in accordance with a predetermined setting, means associated with said control ring for adjusting the setting of the diaphragm blades, a projection on said control ring, an abutment on said operating ring, spring means urging said projection into engagement with the abutment whereby rotation of said operating ring rotates said control ring to position said diaphragm blades immediately prior to actuation of the shutter.

3. A shutter mechanism according to claim 2 and further including a return spring to return said operating ring to the initial position thereof.

4. A shutter mechanism according to claim 2 wherein said operating ring is rotatably mounted on the rear of the shutter housing and has slots therein and further including means disposed in said slots for determining the rest position of said operating ring.

5. A shutter mechanism according to claim 2 wherein said means for adjusting the setting of the diaphragm blades includes a manually rotatable setting ring, a cam surface on said ring and a slide operatively interconnecting said cam with said control ring.

6. A photographic shutter comprising a shutter housing, an operating ring rotatable on the rear of said housing for cooperation with an operating lug for opening and closing the shutter, slots in said operating ring, screw means extending through said slots and into the housing, spring means urging the operating ring into a rest position wherein said screw means engages one end of the slot, diaphragm blades pivotally mounted in said housing, a diaphragm control ring rotatable in said housing, pins on said control ring engageable in slots in the diaphragm blades whereby upon rotation of said control ring said diaphragm blades pivot to open or close, a manual setting ring rotatable on said housing, a cam on said setting ring, a slot in said housing, a slide in said slot, one end of said slide adapted to cooperate with said cam, a pin on the other end of said slide adapted to engage a control slot in said control ring, a projection on said control ring, an abutment on said operating ring, spring means interconnecting the operating ring and the control ring to urge said projection into engagement with the abutment, in the rest position of the operating ring the diaphragm blades being maintained in an open position and upon rotation of the operating ring the control ring being rotated and the slide being forced outwardly into engagement with the cam to close the diaphragm blades to the position determined by the cam, further rotation of the operating ring actuating the operating lug to open and close the shutter.

References Cited by the Examiner

UNITED STATES PATENTS

| | | | |
|---|---|---|---|
| 2,943,551 | 7/1960 | Gebele | 95—64 |
| 2,981,169 | 4/1961 | Schutz | 95—64 |

FOREIGN PATENTS 1,179,578  12/1958  France.

NORTON ANSHER, *Primary Examiner.*

C. B. PRICE, J. F. PETERS, *Assistant Examiners.*